Sept. 21, 1937.   D. W. THOMAS   2,093,787

RING SEAL CLOSURE

Original Filed June 22, 1934

INVENTOR
DAVID W. THOMAS
Kuris, Hudson+Kent
ATTORNEYS

Patented Sept. 21, 1937

2,093,787

UNITED STATES PATENT OFFICE 2,093,787

RING SEAL CLOSURE

David W. Thomas, Youngstown, Ohio, assignor to The Niles Steel Products Company, Niles, Ohio, a corporation of Ohio Application June 22, 1934, Serial No. 731,928
Renewed February 3, 1937

6 Claims. (Cl. 220—61)

This invention relates to improvements in ring seal closures, particularly split rings employed for holding the covers of steel drums in sealing position on said drums.

The invention is an improvement over the construction disclosed in the copending application of Evor Williams and myself, Serial No. 703,338, filed December 21, 1933.

One of the objects of the invention is the provision of an improved guide and mounting member wherein the pinion of a rack and pinion mechanism is carried.

Another object is the provision of an improved lever retaining hook.

Figure 1:
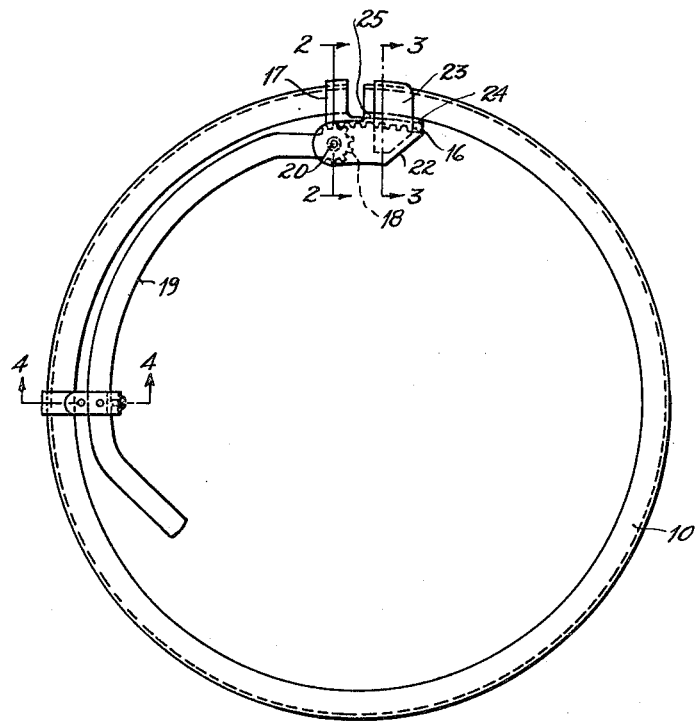

Other objects and features of novelty will appear as I proceed with the description of that embodiment of the invention which, for the purposes of the present application, I have illustrated in the accompanying drawing, in which Fig. 1 is a plan view of a drum ring built in accordance with the present invention and shown in a closed or clamping condition.

Figure 2:
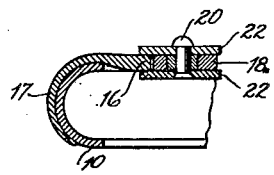
Figure 3:
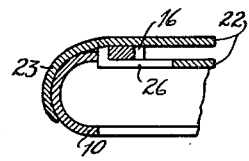

Figs. 2 and 3 are detail cross sectional views on a larger scale, the views being taken substantially on the lines 2—2 and 3—3 of Fig. 1.

Figure 4:
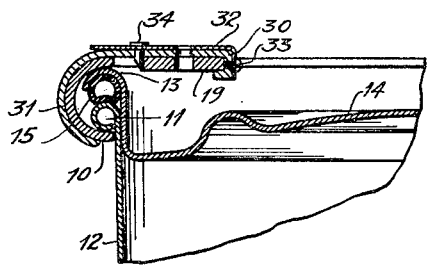
Figure 5:
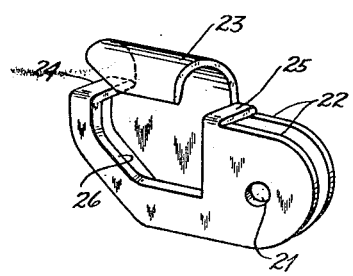

Fig. 4 is a cross sectional view taken substantially on the line 4—4 of Fig. 1, showing the ring in operative position upon a drum, and Fig. 5 is a perspective view of the pinion mounting and rack guide member, viewed from beneath.

In the drawing I have shown the invention applied to a contractible split ring 10 which is C-shaped in cross section. As indicated in Fig. 4, the ring when in closed position upon a drum is caused to embrace a bead 11 on the drum 12 and a flange 13 on the cover 14. A gasket 15 is interposed between the bead 11 and the flange 13. Consequently, when the ring is contracted the cam surfaces on the inside of the ring act to draw the flange of the cover down upon the bead of the drum, compressing the gasket and effectively sealing the drum.

When the ring is to be applied to a drum with a cover assembled thereupon, the ring is expanded sufficiently to enable the operator to place it over the flange 13 and the bead 11, after which the ends of the ring are drawn together by means of a rack and pinion mechanism. The rack of this mechanism is shown at 16. At one end it has a lateral extension 17 which is integral with the rack, although preferably of reduced thickness. The rack itself is formed from heavy gauge metal in order to provide the requisite thickness of teeth, but the lateral extension is thinned down to approximately the thickness of the ring itself. This extension 17 is curved to closely embrace the outer surface of the ring 10, and is secured to the ring by suitable means, preferably by welding. The rack is preferably curved along a circular arc concentric with the curvature of the ring, and the outer or rear surface of the rack is spaced slightly from the inner edge of the ring.

The pinion 18 which meshes with the rack 16 is cut in the end of an operating lever 19, which is pivotally mounted concentric with the pinion by means of a pin or rivet 20 extended through aligned openings 21 in the opposite walls of a double walled member 22, which constitutes a guide for the rack 16 as well as a mounting for the pinion and its lever.

The walls of the member 22 are spaced sufficiently to accommodate the pinion 18 and the rack 16, leaving them the desired freedom of movement. The member 22 is a sheet metal stamping. In the course of its manufacture a lip 23 is struck up. The two walls of the member are then bent into parallel spaced relation with transverse connecting bends 24 and 25 on opposite sides of the lip 23. The lip 23 of course leaves an opening 26 in the lower side wall of the member, which however is not visible from above when the ring is in position upon a drum.

The lip 23 is curved to embrace the outer surface of ring 10, in the same manner as does extension 17, and it is secured to the ring in the same way, the attachment in both cases being extremely rigid and permanent. The rigidity is assisted in the case of member 22 by the fact that the transverse bent portions 24 and 25 are caused to abut against the inner edge of the ring 10, see Fig. 3, thereby resisting any force tending to bend the inner end of member 22 downwardly.

The lever 19 is curved throughout the greater portion of its length in such manner as to lie close to the ring 10 when the latter is in closed position. The ring is held in such position by a hook 30 which has an integral curved extension 31 embracing the ring 10 and secured thereto by welding or the like in the same manner as in the case of the extension 17 and the lip 23. When the ring is being drawn into clamping position the lever 19 is pulled far enough toward the periphery of the ring to clear the bottom of hook 30, when the natural tendency of the ring to expand will force the lever into the bight of the hook. A spring metal plate 32 is secured to the hook 30 by screw 33 or the like. On this plate there is a pin 34 which normally extends downwardly through a hole in hook 30 and into engagement with the outer edge of the lever 19, thereby holding the latter against accidental disengagement from the hook. When it is desired to release the lever, the operator inserts a finger nail beneath the outer edge of spring plate 32 and raises the latter sufficiently to disengage the pin 34 from the lever, after which a slight outward pressure on the lever will permit it to be disengaged from the hook.

In the foregoing description I have necessarily gone somewhat into detail in order to explain fully the particular embodiments of the invention herein illustrated, but I desire it to be understood that such detail disclosures are not to be construed as amounting to limitations except as they may be included in the appended claims.

Having thus described my invention, I claim:

1. In a closure means for metal drums, a split ring, rack and pinion means for contracting and expanding the ring, a mounting for the pinion and guide for the rack comprising two spaced plates connected along one edge by bent portions integral with the plates, and an integral hook portion extending from said mounting and embracing the outer surface of the ring and secured thereto.

2. In a closure means for metal drums, a split ring, rack and pinion means for contracting and expanding the ring, a mounting for the pinion and guide for the rack comprising a sheet of metal bent to form spaced sides and a connecting portion along one edge, said sheet including a lip struck up out of a part of one side and a part of the said connecting portion, said lip being hook-shaped and extending around the exterior of the ring and secured thereto, the sides of said mounting having means for rotatably supporting a pinion, and the rack of said rack and pinion means being guided by said connecting portion.

3. A closure means for steel drums or the like, comprising a cover securing split ring C-shaped in cross section, projections extending inwardly from the ends of the ring, said projections comprising pieces of sheet metal having curved portions embracing the ring on its outer surface and secured thereto, one of said projections carrying a rack, and the other projection constituting an integral part of a double walled guide formed from a single piece of sheet metal, and a pinion rotatably mounted between the two walls of said guide and meshing with said rack.

4. A closure means for steel drums or the like, comprising a cover securing split ring C-shaped in cross section, projections extending inwardly from the ends of the ring, said projections comprising pieces of sheet metal having curved portions embracing the ring on its outer surface and secured thereto, one of said projections carrying a rack, the other projection constituting an integral extension of one wall of a double walled guide formed from a single piece of sheet metal, the other wall of said guide being connected to said first mentioned wall by a transverse connecting bend forming a backing for said rack, and a pinion meshing with the rack and rotatably mounted between the two walls of said double walled guide.

5. A closure means for steel drums or the like, comprising a cover securing split ring C-shaped in cross section, projections extending inwardly from the ends of the ring, said projections comprising pieces of sheet metal having curved portions embracing the ring on its outer surface and secured thereto, one of said projections carrying a rack, the other projection constituting an integral extension of one wall of a double walled guide and mounting member formed from a single piece of sheet metal, said extension being located intermediate the ends of the said wall, the other wall of said guide and mounting member being connected to said first mentioned wall by transverse connecting bends on opposite sides of the extension, said bends forming back guides for said rack, and a pinion meshing with said rack and rotatably mounted between the two walls of said double walled guide and mounting member.

6. In a closure means for metal drums, a split ring, rack and pinion means for contracting and expanding the ring, a mounting for said pinion and guide for the rack comprising spaced sides and an integral connecting portion along one edge, and an integral hook portion embracing the ring adjacent one end of the latter and secured thereto, and means for rotatably supporting the pinion between the sides of said mounting.

DAVID W. THOMAS.